Figure 1:
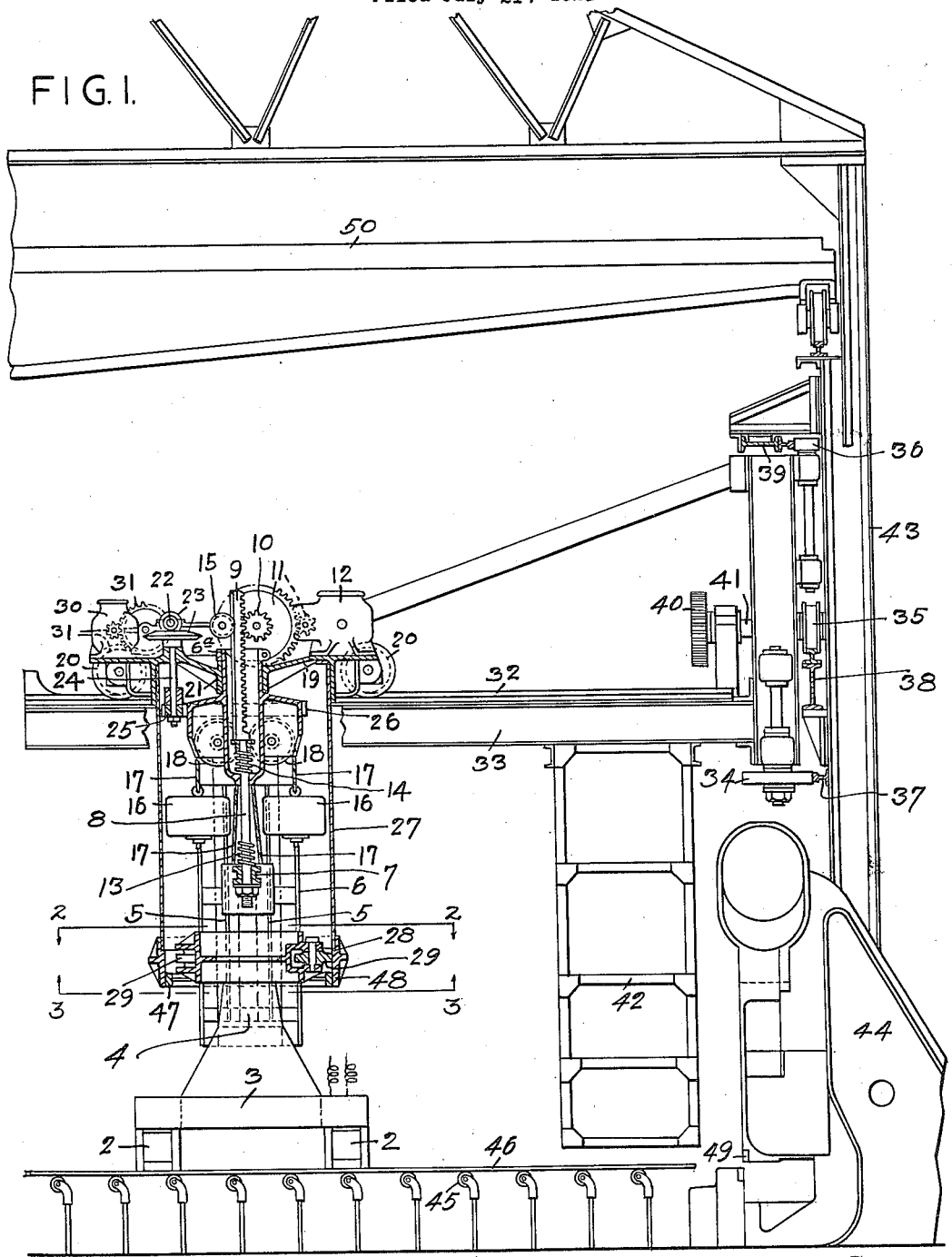

Sept. 4, 1923.

H. S. EVANS ET AL 1,466,823

MAGNET MANIPULATOR

Filed July 21, 1921

3 Sheets-Sheet 2

INVENTORS

Sept. 4, 1923.
H. S. EVANS ET AL
1,466,823
MAGNET MANIPULATOR
Filed July 21, 1921  3 Sheets-Sheet 3
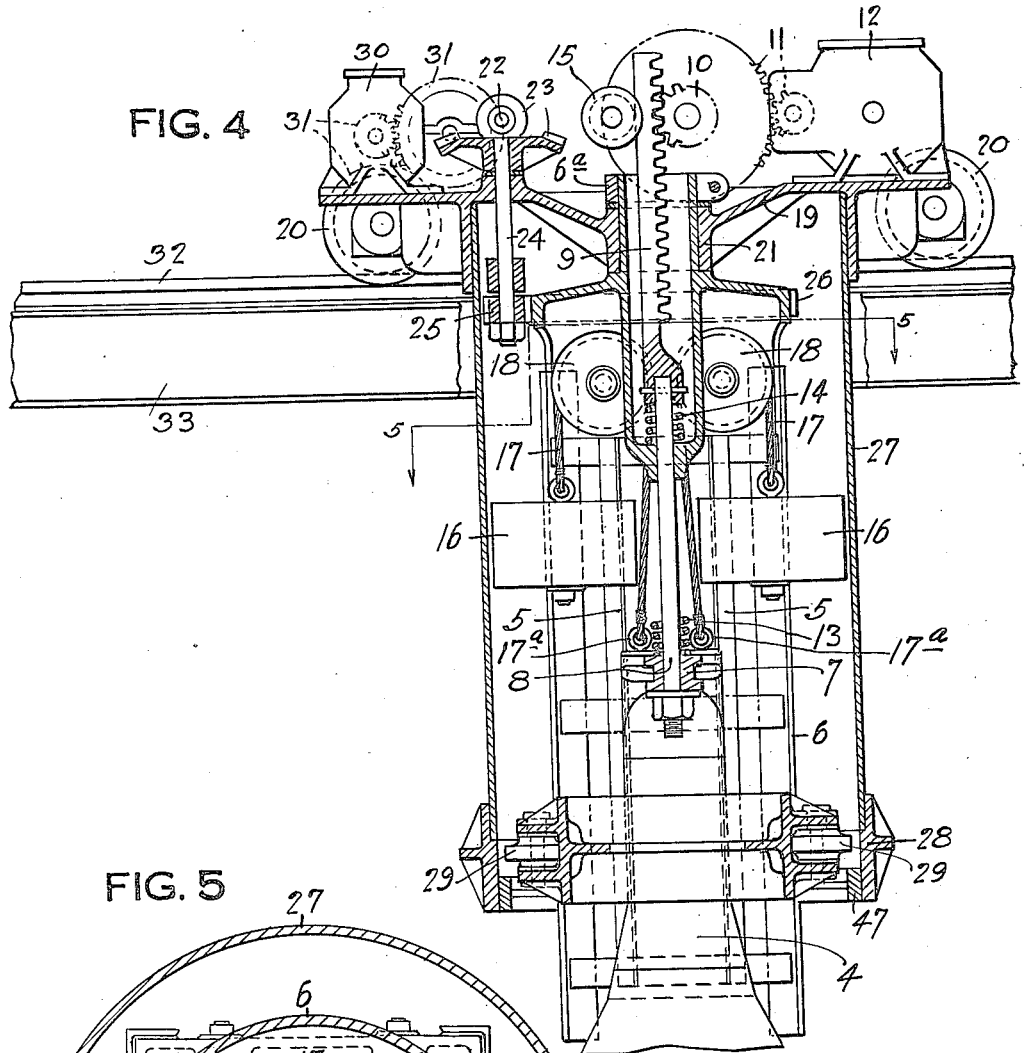
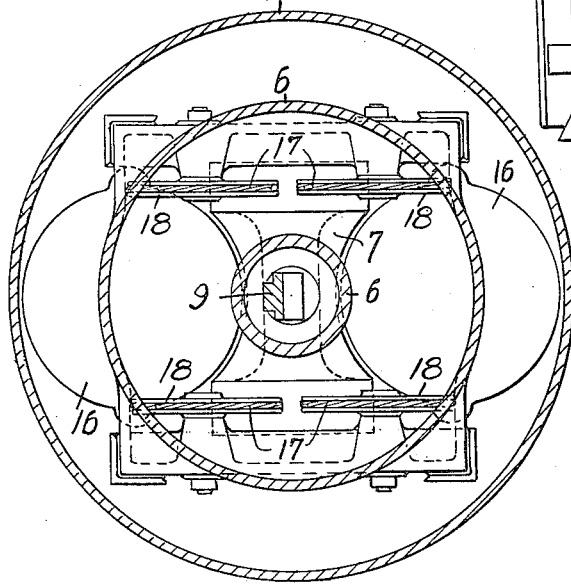
INVENTORS Patented Sept. 4, 1923.

1,466,823

UNITED STATES PATENT OFFICE.

HENRY S. EVANS AND GUSTAF L. FISK, OF HARRISBURG, PENNSYLVANIA.

MAGNET MANIPULATOR.

Application filed July 21, 1921. Serial No. 486,633.

*To all whom it may concern:*

Be it known that we, HENRY S. EVANS, a citizen of the United States, and GUSTAF L. FISK, a subject of the King of Sweden, residents of Harrisburg in the county of Dauphin and State of Pennsylvania, have invented a new and useful Improvement in Magnet Manipulators; and we do hereby declare the following to be a full, clear, and exact description thereof.

Our invention relates to apparatus for the handling of materials which can be magnetized, and more particularly to those cases in which such materials must be accurately handled, placed or manipulated. It is now customary to handle such materials by magnets suspended from cranes by means of cables or chains; or they are handled by hooks or chains or cables attached to cranes, or by men carrying the materials or propelling them over some type of roller bed or skid. With all these methods of handling considerable labor must be employed if accuracy is required, which entails unnecessary expense and slow operation. In other cases the desired precision in handling such materials must now be foregone for the sake of economy.

The object of our invention is to obtain desired accuracy through the medium of a magnet forming part of, and the motions of which are definitely and precisely controlled by, a machine performing the necessary operations. We have thus eliminated the uncertainty and inaccuracy of operation attending the use of a magnet suspended from a hook, chain or cable, and by making the magnet a rigid and integral part of a machine have greatly extended the scope of its use. Our invention will make it possible economically and efficiently to unload, load or pile materials in an orderly and accurate manner. It will also economically and efficiently handle materials in process of manufacture where it is necessary or desirable to manipulate or exactly locate them for any operations.

A particular and preferred application of our invention is to the handling and manipulating of steel plates during the process of shearing. In present plate mill practice where plates are trimmed and cut to size on guillotine shears, the plates are usually delivered for shearing on to a stationary bed of castors in front of the shears. Rolling on this bed of castors the plates are moved by manual labor, aided in cases where the plate is heavy by an overhead crane with chains or hooks. By these means the plate is brought to the approximate position required and the final adjustment before cutting is then made by hand. While the cut is being made the plate is held in place by manual effort or in some cases a stationary magnet affixed to the shears is provided for this purpose. Upon the completion of the cut the plate is moved into a new position and again adjusted for cutting, which operation is repeated until the plate is sheared to required shape and size. This customary method of shearing is slow, arduous and inaccurate and requires a large force of men.

Our invention will eliminate a great part of the manual labor, will handle and manipulate the plates more rapidly and accurately, and will bring about more exact shearing of the plates through the ability to hold them firmly in place during the act of cutting.

Figure 2:
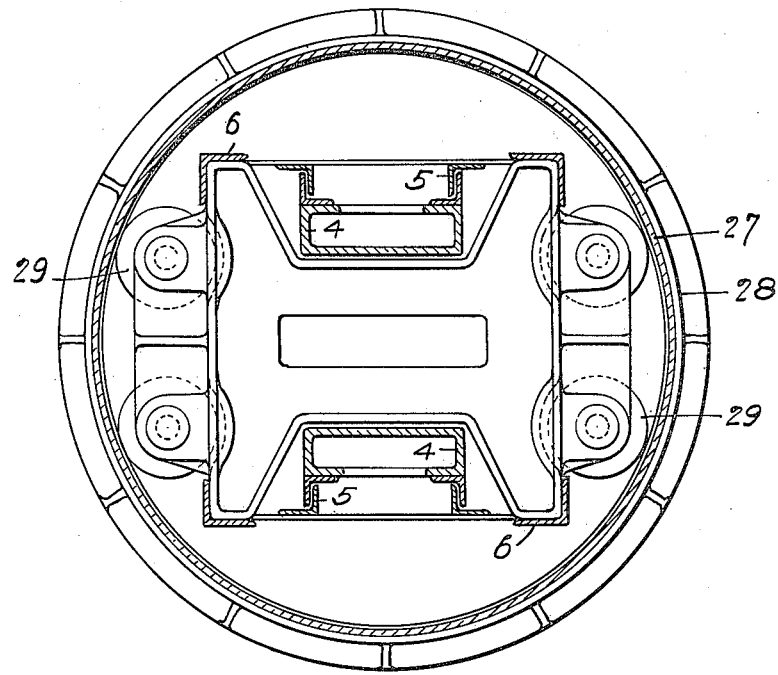
Figure 3:
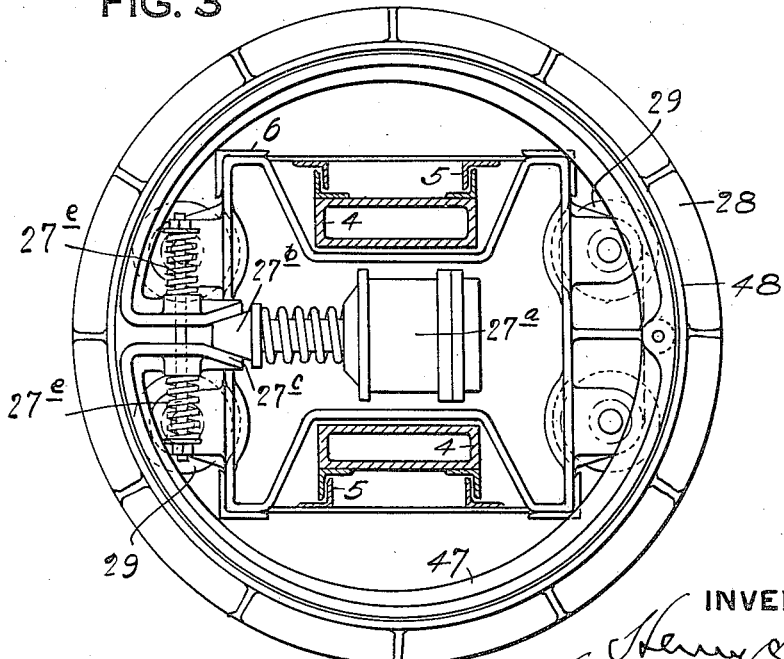

In the accompanying drawing, Fig. 1 is a vertical elevation of our improved machine partly in section; Fig. 2 is an enlarged section on the line 2—2, Fig. 1, looking downwardly; and Fig. 3 is a section on the line 3—3, looking upwardly; Fig. 4 is an enlarged vertical elevation of the vertically movable member, raising and lowering means, rotary member, stationary member, etc.; and Fig. 5 is a section on the line 5—5, Fig. 4.

The magnets 2 are connected by a beam 3 which is rigidly mounted to a cross-head 4 movable up and down in guides 5 which are a part of the revolving leg 6. The cross-head 4 with bearings 7 revolves on and is carried by vertical shaft 8 attached to rack 9 which in turn is actuated by pinion 10, train of gears 11 and motor 12. Springs 13 and 14 serve as bumpers at the upper and lower limits of the motion of the cross-head. Roller 15 serves to keep the rack 9 in proper mesh with pinion 10. Counterweights 16 are provided to balance part or all of the weight of the cross-head and magnets. These counterweights are suspended from cables 17 which are attached to cross-head 4 by means of eye bolts 17$^a$, and run over pulleys 18 mounted in revolving leg 6. Pinion 10, train of gears 11 and motor 12 are all mounted on trolley frame 19 which travels on wheels 20.

Revolving leg 6 is suspended from trolley frame 19 by the split collar 6$^a$ secured to the upper end of said leg, and rests on bearing 21. Bearing 7 permits revolving leg 6 and cross-head 4 with magnets to turn on vertical shaft 8. The turning motion of the revolving leg is effected through a motor mounted on the trolley frame 19 and driving shaft 22, bevel gear 23, shaft 24, pinion 25 and gear 26 on the circumference of the revolving leg 6.

Vertical frame 27, rigidly attached to trolley frame 19, carries at its lower end a roller race 28 or ring which serves as a bearing for the revolving leg 6. For this purpose revolving leg 6 carries rollers 29 which travel in roller race 28.

Motor 30 and train of gears 31 drive the trolley wheels 20 causing the trolley consisting of trolley frame 19 and all of the aforesaid parts carried by it or mounted thereon, to travel back and forth at right angles to the line of the shear knife on rails 32 of crane bridge 33. Said crane bridge moves in a line parallel to the shear knife on wheels 34, 35 and 36 and is carried and supported by runways 37, 38 and 39. A motor (not shown) mounted on the crane bridge 33 drives the wheels 35 through a train of gears 40 and shaft 41. The operator who controls all motions and functions of the entire machine by means of electric controllers is stationed with these controllers in cage 42 suspended from crane bridge 33.

In the layout shown the crane girders are attached to columns of building 43 and a series of electric conductors along these crane columns and alongside the crane bridge 33 in customary manner furnish electric current to the various controllers and motors, and to the magnets of the machine, which machine is shown mounted directly above and in front of a set of guillotine plate shears 44. Castors 45 serve to carry the steel plate 46 to be sheared.

The motor driving shaft 22 and causing the turning motion of revolving leg 6 is connected in series with a solenoid operated brake which operates brake band 47 and, when said motor is idle, causes brake band 47 to press against ring 48, which is integral with roller race 28 and attached to vertical frame 27. The solenoid 27$^a$ has the tapering head 27$^b$ which engages the inwardly extending portions 27$^c$ of the brake band 47, so that when said tapering head is advanced the brake band is forced out against the ring 48 and when said head is withdrawn the springs 27$^e$ cause said ring 47 to collapse and the brake is released. The revolving leg 6, magnets 2 and plate 46 are thus held in position by brake band 47 whenever the motor 30 is at rest and the chances for inaccuracy due to lost motion in the machine between said motor and the plate is thus eliminated. Solenoid-operated brakes are also provided to avoid lost motion between the plate and the motors driving the trolley and the bridge of the machine. For this purpose the trolley and bridge drive shafts are provided with brake drums, keyed to these shafts, which drums are in contact with the brake bands of the solenoid brakes and held from revolving by spring pressure on these brake bands, whenever the respective motors are not running. The solenoids, being electrically connected in series with their respective motors, when energized overcome the spring pressure on the brake bands and thus release the drive shafts whenever current is admitted to the motor circuit and the motor thus made to run. The operations of the entire machine are thus made exact and definite with no chance for give or motion of the plate 46 while held by the machine in any particular position.

By lowering the cross-head 4 the magnets are brought into contact with the steel plate 46, and when energized seize it firmly. By raising the cross-head 4, turning the revolving leg 6, moving the trolley, and the crane bridge 33, along their lines of travel, the steel plate can be moved and accurately manipulated to any desired position for cutting by the shear knives 49, without the help of manual labor. When the plate is thus adjusted by the machine to the line on which the cut is to be made, the magnet is lowered so that the plate rests upon the castor bed and the bottom knife block of the shears and is there firmly held by the machine, due to the machine pressing the plate against the bottom knife block and against the castor bed and due to the solenoid brakes overcoming lost motion in the machine, so that no motion of the plate can occur which would allow the cut to deviate from the fixed line. The cage for the operator of the machine is placed directly over the plate being sheared and at the same time directly in front of and above the shear knives. Due to his position and by his complete control of the machine the operator can move the plate away from and toward the shears, turn the plate around to any desired side or angle, move the plate along the shears to any desired part of the plate, adjust the line to be sheared exactly to the shear knife, and hold the plate down rigidly upon the castor bed and shear knife holder during the actual cutting of the plate, due to indirect pressure exerted on plate by motor 12, due to magnetism and due to solenoid brakes. Upon the completion of the shearing he can lift the plate away from the castor bed and dispose of it at any point within the reach of the machine.

Whereas, we have described a particular and preferred use of our machine, it is also adapted for handling any material which can be magnetized in other manufacturing operations, loading, unloading or piling.

Claims:

1. In a machine for handling magnetizable materials, the combination of a vertically movable member, means for raising and lowering same, a magnet carried by said member, a rotary member engaged by said vertically movable member, means for rotating said rotary member, a frame surrounding said rotary member, a brake band carried by said rotary member, and means for forcing said brake band into engagement with said surrounding frame.

2. In a machine for handling magnetizable materials, the combination of a vertically movable member, means for raising and lowering same, a magnet carried by said member, a rotary member engaged by said vertically movable member, means for rotating said rotary member, an adjacent non-rotating member, and means to accomplish a brake action between said rotary member and said non-rotating member.

3. In a machine for handling magnetizable materials, the combination of a vertically movable member, means for raising and lowering same, a magnet carried by said member, a rotary member engaged by said vertically movable member, means for rotating said rotary member, an adjacent non-rotating member, and means for locking said rotary member to said non-rotating member.

In testimony whereof, we, the said HENRY S. EVANS and GUSTAF L. FISK, have hereunto set our hands.

HENRY S. EVANS.
    GUSTAF L. FISK.

Witnesses:
 G. R. SONDER,
 ROY D. GOOD.